(12) United States Patent
Jadhav (10) Patent No.: US 7,636,713 B2
(45) Date of Patent: Dec. 22, 2009

(54) USING ACTIVATION PATHS TO CLUSTER PROXIMITY QUERY RESULTS

(75) Inventor: Apurva Rameshchandra Jadhav, Nagpur (IN)

(73) Assignee: Yahoo! Inc., Sunnyvale, CA (US)

( * ) Notice: Subject to any disclaimer, the term of this patent is extended or adjusted under 35 U.S.C. 154(b) by 295 days.

(21) Appl. No.: 11/729,203

(22) Filed: Mar. 27, 2007

(65) Prior Publication Data
US 2008/0183695 A1    Jul. 31, 2008

(30) Foreign Application Priority Data
Jan. 31, 2007    (IN)    ............. 194/DEL/2007

(51) Int. Cl.
*G06F 17/30*    (2006.01)
(52) U.S. Cl. ............. 707/4; 707/5; 707/7; 707/104.1
(58) Field of Classification Search ............. 707/1–7, 707/104.1
See application file for complete search history.

(56) References Cited

U.S. PATENT DOCUMENTS

| | | | |
|---|---|---|---|
| 6,434,556 B1 * | 8/2002 | Levin et al. ............. | 707/5 |
| 6,442,545 B1 * | 8/2002 | Feldman et al. ............. | 707/6 |
| 6,636,853 B1 * | 10/2003 | Stephens, Jr. ............. | 707/10 |
| 7,272,612 B2 * | 9/2007 | Birdwell et al. ............. | 707/101 |
| 7,464,074 B2 * | 12/2008 | Sebbane ............. | 707/3 |
| 2005/0108203 A1 * | 5/2005 | Tang et al. ............. | 707/3 |
| 2006/0031219 A1 * | 2/2006 | Chernyak et al. ............. | 707/5 |
| 2006/0117002 A1 * | 6/2006 | Swen ............. | 707/4 |

OTHER PUBLICATIONS

Goldman et al. "proximity search in database", infolab.stanford.edu, 1998, pp. 1-24.*
Baeza-Yates et al., "Generalization PageRank: Damping Functions for Link-Based Ranking Algorithms" *SIGIR*, Seattle, Washington, Aug. 6-10, 2006, 8 pages.
Bhalotia, et al., "Keyword Searching and Browsing in Databases using BANKS" Computer Science and Engg. Dept., I.I.T. Bombay, 10 pages.
Balmin et al., "ObjectRank: Authority-Based Keyword Search in Databases" Proceeding of the 30th VLDB Conference, Toronto, Canada 2004, 12 pages.
Goldman et al., "Proximity Search in Databases" Proceedings of the 24th VLDB Conference, New York, USA, 1998, pp. 26-37.
Haveliwala, Taher H., "Topic-Sensitive PageRank" *WWW2002*, Honolulu, Hawaii, USA, May 7-11, 2002, 10 pgs.

* cited by examiner

*Primary Examiner*—Don Wong
*Assistant Examiner*—Hanh B Thai
(74) *Attorney, Agent, or Firm*—Hickman Palermo Truong & Becker LLP (57) ABSTRACT

A search engine finds and ranks information in clusters so a user can select information listed in search results that are closer to his information needs. To do so, the search engine receives a proximity query and executes it against an entity-relationship graph. The search engine finds those entities in the graph that have similar relationships between nodes. For example, two entities in a graph may be connected to entirely different nodes, but they may connect to those different nodes using similarly labeled paths. The search engine identifies the relationship between the nodes, clusters entities that are connected by similar relationships, and presents the clustered information to the user as part of the search results. In this way, the search engine provides a user with a results from which the user can select the group of results that most closely match his information need.

18 Claims, 4 Drawing Sheets

USING ACTIVATION PATHS TO CLUSTER PROXIMITY QUERY RESULTS

CROSS REFERENCE TO RELATED APPLICATION

This application claims the benefit of priority to India Patent Application No. 194/DEL/2007 filed on Jan. 31, 2007, entitled "USING ACTIVATION PATHS TO CLUSTER PROXIMITY QUERY RESULTS" which is incorporated by reference in its entirety for all purposes as if originally set forth herein.

BACKGROUND

Relational databases are commonly searched using structured query languages. In the past, to query a conventional relational database, a user needed to have an understanding of the database's underlying schema. With the rapid growth of the Internet, there has been a tremendous increase in the number of users who access information stored in online databases. These users generally have no knowledge of the underlying database schemas and have very limited familiarity with query languages. As a result, the search techniques available to those users are different than the queries a user familiar with the database schema would use. In fact most users use search engines that provide simpler mechanisms, such as keyword searching to access information in online databases.

A user can search for information from a search engine by typing in keywords and submitting those keywords as a search query to the search engine. When the search query has been submitted, the search engine looks for those keywords among a number of the fields and indexes associated with its databases. If the search engine finds documents or other information ("data") related to the keywords, then the search engine generates a list of that data and displays it to the user as search results. The search results typically list data, such as links to the documents, retrieved by the search engine.

One mechanism search engines use to find documents related to keywords in a search query is a proximity query. A proximity query is often used (either explicitly or implicitly) by a search engine to retrieve and rank information from its databases.

One of the problems with the way current proximity queries are currently handled is that the ordering of the search results is based heavily on the way relationships between separate pieces of data have been defined and weighted in the search engine's database and indexes. Unfortunately, a user is typically unaware of those weights and relationships. Thus, a user submitting a search query to a search engine may place a different weight on a particular relationship than the actual weight assigned by the search engine. As a result, the proximity query may not be able to identify the type of information the user is looking for.

For example, a user may be interested in finding out information about people who work with a man named Jack. Hence, the user submits a search query to a search engine to find out more information about Jack. Unfortunately, if the search engine places more weight on people who exchange emails with Jack rather than on people Jack works with, then the results the search engine finds will not capture the information the user intended to find.

Thus, how the relationships between separate pieces of information are defined and weighted by a search engine affect the search results displayed to the user and often provide the user with unhelpful results. In other words, although the user is interested in finding people who work with Jack, if the search engine database has given a low weight to the "works with" relationship, then persons who work with Jack in the database may get ranked lower in the search results list than other results. As a result, more desirable results may be ranked lower than they should be.

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview

Mechanisms described herein find and rank information in clusters so a user can select information according to his information needs. In one embodiment, a search engine mechanism receives a proximity query and executes it against an entity-relationship graph. The search engine mechanism finds those entities in the graph that have relationships similar to other entities. For example, two entities in a graph may be connected to entirely different nodes, but they may connect to those different nodes using similarly labeled edges (e.g., "worksFor"). The relationship between the nodes may be important to the user (e.g., the user may be looking for situations where one entity worksFor another entity). In one embodiment, the search engine mechanism identifies the relationship between the nodes, clusters entities that are connected through similar relationships, and presents the clustered information (e.g., the entities with similar relationships) to the user as part of the search results. For example, the clustered information may be presented as a list with a links to each specific cluster. In this way, the search engine mechanism provides a user with a set of results from which the user can select the group of results that most closely match his information need.

Web-Based Environment

Even though the techniques described herein are described in terms of a search engine and/or Internet environment, these environments are meant only to serve as exemplary environments in which the techniques of the present invention are employed. In alternative implementations, the techniques may be employed in other environments. For example, the techniques could be employed outside a web browser in a news reader application, desktop search application, or document editor.

Example Search Engine

In addition, many of the techniques described herein are discussed in connection with a search engine. In one embodiment, the search engine described is a web search engine. In alternative embodiments, the search engine may be of a different type. A search engine includes software tools to receive search queries, to execute search queries, and to generate search results based on search terms in the search queries.

For example, suppose a search engine receives a search query that contains the search term "John Doe". According to one embodiment, a search engine executes the search query and generates a set of search results. In one embodiment, the step of executing the search query by the search engine involves looking up information related to the search terms in a set of repositories. In one embodiment, the search engine uses indexes to find references, links, and other information that are related to the search query in the set of repositories. The relatedness of the search terms to the search results is determined, in one embodiment, by finding and ranking result clusters.

Exemplary System for Finding Result Clusters

Figure 1:
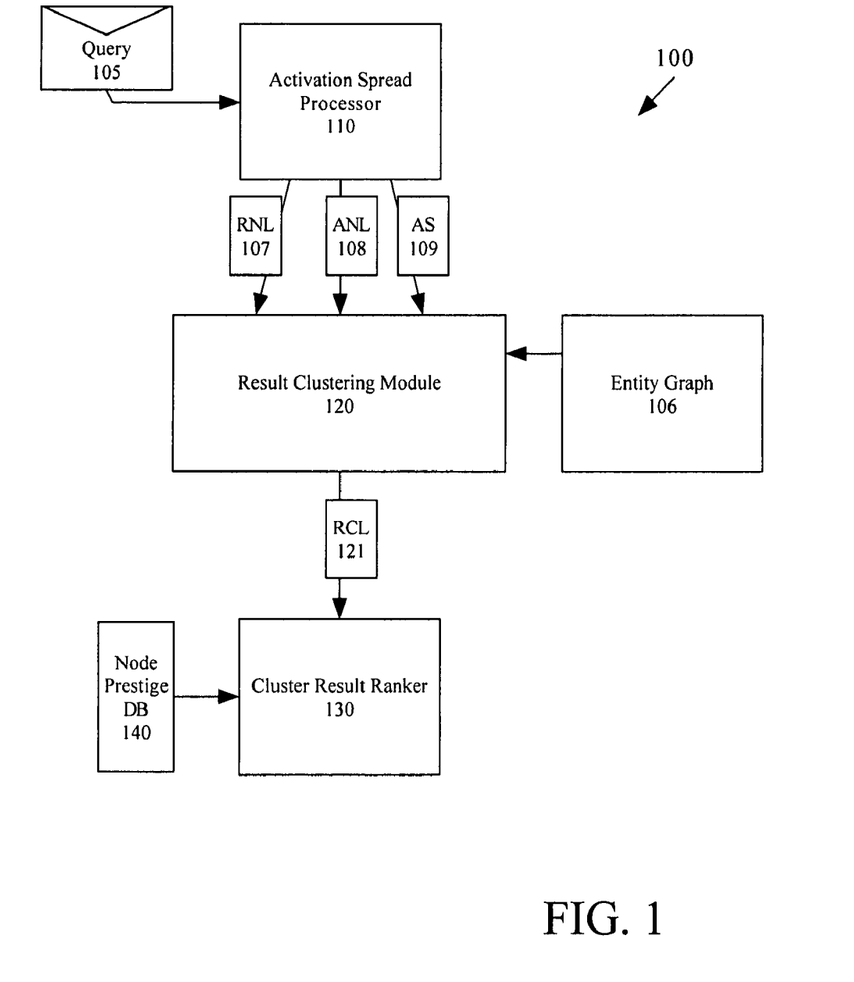
FIG. 1 illustrates a block diagram of an example system for generating ranked result clusters, according to an embodiment of the invention.

FIG. 1 illustrates an exemplary system 100 for finding result clusters in response to a search query. In one embodiment, system 100 is part of a search engine. According to one embodiment, system 100 receives a proximity query and executes it. System 100 then generates result clusters among the proximity query results by grouping similar results together. By doing so, a user can select those results that are nearer to his information need. In one embodiment, the result clusters also allow a user to refine their search by showing the paths that connect information in the database.

To execute a proximity query and generate result clusters, several tools of system 100 are illustrated in FIG. 1. In one embodiment, those tools include activation spread processor 110, result clustering module 120, cluster result ranker 130, and node prestige database 140. System 100 also includes an entity-relationship graph 101. In one embodiment, entity-relationship graph 101 corresponds to graph 200 illustrated in FIG. 2.

In other embodiments, system 100 may include a different set of tools and components.

Entity-Relationship Graph

A proximity query is a mechanism a search engine can use to (either explicitly or implicitly) retrieve and rank information from its databases. A proximity query works particularly well for finding information where the underlying data is stored in a semi-structured format, such as an entity-relationship graph.

Entity-relationship graph 106, in one embodiment, is an undirected graph that includes a set of nodes connected by a set of edges. Each node in the entity-relationship graph has a specific type, as well as, an associated text or attribute value. An edge in the entity-relationship graph connects two or more nodes together, and each edge may be of a specific type and weight. The weight of an edge is a measure of the edge's importance and can be assigned in a variety of ways as discussed herein.

Figure 2:
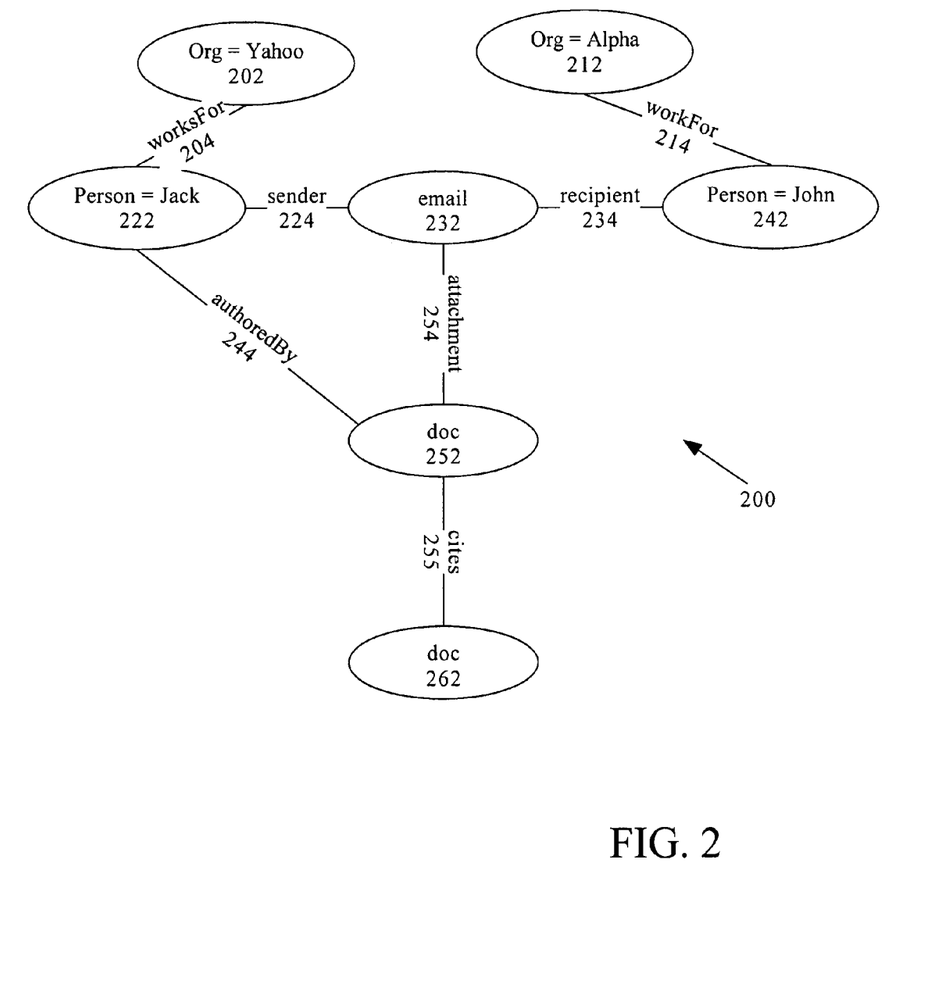
FIG. 2 illustrates an example entity-relationship graph, according to an embodiment of the invention.

FIG. 2 illustrates an example of an entity-relationship graph 200. In one embodiment, graph 200 may represent an instance of a stored social network, which includes entities such as person, organization, and document. Alternatively, graph 200 may represent something else. Graph 200 includes a set of nodes (e.g., nodes 202, 212, 222, 232, 242, 252, and 262) and a set of edges (204, 214, 224, 234, 244, 254, 255, and 264). The nodes in graph 200 represent entities and the edges are examples of relationships that can exist between nodes (e.g., "worksFor", "authoredBy", "sender", "recipient", etc.). Other entity graphs may include a different set of nodes and edges.

Proximity Query

When executed against an entity-relationship graph, a proximity query attempts to find an entity of a specified type near a specified keyword or attribute value. A proximity query usually takes the following format: FIND <entity> NEAR <predicate>, where <predicate> is a set of keywords or attributes values in the graph. For example, in connection with FIG. 2, suppose the proximity query "FIND 'org' NEAR 'John'" is executed against graph 200. The intended result of the proximity query is to return the organization entities nearest to "John". To get that result, the proximity query and the entity-relationship graph are submitted to system 100. In one embodiment, activation spread processor 110 is the component that receives the proximity query.

Activation Spread Processor

In one embodiment, activation spread processor is a component of a search engine. Alternatively, it is a software tool separate from a search engine. The activation spread processor receives as input a proximity query and an entity-relationship graph. Upon receiving a proximity query, the activation spread processor executes the proximity query against the entity-relationship graph to determine (1) activator nodes in the entity graph, (2) a list of result nodes, and (3) activation scores for each node in the entity-relationship graph.

To illustrate, in one embodiment, activation spread processor 110 receives as input proximity query 105 and graph 106 and executes proximity query 105 against graph 106. Proximity query 105 recites "FIND 'org' NEAR 'John'". When activation spread processor 110 executes the proximity query, it assumes initially that all nodes of type "org" are candidate result nodes (e.g., candidate nodes to be added to list of result nodes 107). Using information in the predicate clause (e.g., NEAR 'John'), activation spread processor 110 narrows the candidate result nodes to the set of nodes that best satisfy the predicate clause in proximity query 105. The nodes that do satisfy the predicate clause are called "activator nodes."

For example, in FIG. 1, the candidate result nodes are node 202 ("Alpha") and node 212 ("Yahoo") since they are the only nodes in graph 200 of the specified type in proximity query 105 (e.g., type "org"). Activation spread processor 110 also classifies node 242 as an activator node since it is the only node in graph 200 that satisfies the predicate clause (e.g., it includes the keyword "John").

In one embodiment, activation spread processor 110 then proceeds to find candidate result nodes that are "near" activator nodes. "Nearness", in this context, is based on an evaluation of the paths between an activator node and candidate result nodes and is a measurement of the distance between an activator node and the candidate result nodes. The shorter a path is to a candidate result node (e.g., the fewer edges or less weighted the path) the nearer the candidate result node is to the activator node.

In one embodiment, the steps for calculating the nearness of a candidate result node to an activator node in an entity-relationship graph includes finding an activation value for the activator nodes' neighbors, then finding an activation value for the neighbors' neighbors, and repeating this process either a fixed number of times or until a steady state has been reached.

Activation Value

The activation value refers to a value assigned to nodes in an entity-relationship graph. According to one embodiment, the activation value identifies the relative importance and/or rank of an entity in the entity-relationship graph. In one embodiment, the activation value may be a human assigned value. In other embodiments, the activation value of a node may be computed by an algorithm such as a page rank algorithm. In yet other embodiments, a different means may be used to assign an activation value to the node.

Neighbor Activation Value

To calculate the activation value of a neighbor node, one solution involves taking the activation value of the activator node and dividing it by the sum of the number of edges entering and leaving the activator node from the neighbor node and then multiplying the result by the weight of the edges between the activator node and the neighbor node. According to one embodiment, this result can be dampened using a standard linear or exponential dampening function.

A mathematical equation for finding a neighbor's activation value is listed below as Equation 1:

$$(\text{activation}(n)/(\text{degree}(n))*\text{Weight}(\text{Edge}(n,\text{nbr}))*\text{damp}(\text{idx})) \quad \text{Equation 1}$$

In Equation 1, activation(n) is the activation value of the activator node, degree(n) is the number of edges connected to the activator node, and Weight(Edge(n, nbr)) is the total assigned weight of the edges between the activator node and the neighbor node. In one embodiment, damp(idx) is a dampening function that limits the number of iterations performed by the search engine to calculate activation values. "Idx" specifies the number of iterations or neighbor levels for which an activation value will be calculated.

In one embodiment, a node can have multiple activation values. For example, node 202 may have an activation value associated with node 212, another activation value associated with node 222, and separate activation value associated with each of the other nodes in graph 200. Alternatively, an overall activation value may be calculated for a node (e.g., by summing the activation values associated with neighbors or by assigning a fixed value to a node). In other embodiments, the activation value may be computed in some other way.

Example Operation of Calculating Nearness

To illustrate how to calculate the nearness of one node to another in an entity-relationship graph, assume a user inputs the proximity query "FIND 'org' NEAR 'John'" to activation spread processor 110. Activation spread processor 110 then executes the query against its entity-relationship graph, which in this example is assumed to be graph 200 in FIG. 2.

Accordingly, to calculate the nearness of candidate result nodes to activator node 242, the activation spread processor 110 processes the nodes in graph 200 according to the algorithm outlined in Equation 1. The activation spread processor 110 begins by traversing graph 200 until it finds an activator node containing the keyword "John" (e.g., node 242). Alternatively, activation spread processor 110 may find node 242 by simply looking up the keyword "John" in an index for graph 200.

In one embodiment, when activation spread processor 110 finds an activator node it adds the activator node to activator node list 108. Activator node list 108 refers to an object, queue, list, stack, text file, or other data structure that stores name and reference information about activator nodes.

When activation spread processor 110 finds activator node 242, in one embodiment, activation spread processor 110 checks to see if the node already has a fixed activation value. If node 242 does not, then activation spread processor 110 calculates an activation value for node 242 (e.g., through a page rank algorithm). For this example, assume node 242 has already been assigned an initial activation value. The activation value is one. Also, for purposes of explanation, assume that the other assigned edge weights and activation values associated with graph 200 are one.

Once activation spread processor 110 has found activator node 242, it spreads the activator node's activation value to its neighbor nodes (e.g., nodes 212, 232, and 262). To illustrate, the activation value for neighbor node 212 is calculated by plugging values derived from node 242 into Equation 1. The resulting calculation occurs as follows:

Activation value(n)=1 (e.g., because node 242 has an activation value of 1). Thus, 1 is divided by degree(n) or 2 (e.g., because the number of in- and out-edges from node 212 to node 242 is two). That value is multiplied by the Weight(edge (n, nbr)) or 1 (e.g., because as stipulated the weight of edge 214 is one and it is the only edge between node 212 and node 242). More simply written, the activation value for neighbor node 212 is ½*1=½. Hence, the activation value for node 212 is ½. The activation values for neighbor nodes 232 and 262 could be calculated in a similar fashion.

In one embodiment, the activation value for each node is recorded in activation scores list 109. Activation scores list 109, according to one embodiment, refers to an object, queue, list, stack, text file, or other data structure that stores activation values about nodes in graph 106.

Once the neighbor nodes' activation values have been calculated, then the activation values for the next set of neighbors (e.g., the nodes that neighbor nodes 212, 232, and 262) are calculated. This process may be repeated until a fixed number of iterations have been completed or until graph 200 has been completely traversed.

Once an activation value has been determined for each of the candidate result nodes in graph 200, the candidate result nodes are ranked based on their computed activation value. For example, in FIG. 2, suppose the activation value for node 212 is ½, and the activation value for node 202 is less than that. According to one embodiment, node 212 is nearer to "John" (e.g., it has a higher activation value) so it is ranked higher than node 202 in result node list 107 for proximity query 105.

Result node list 107 refers to an object, queue, list, stack, text file, or other data structure that stores name and reference information about result nodes. In one embodiment the list of result nodes may include only a certain number of candidate result nodes (e.g., the top five or ten results), a percentage of the top results, those that are above a certain nearness value, etc.

Note that activation spread processor 110 may capture, in addition to capturing the path distances between nodes, the number of paths linking to a node. As a result, nodes linked to activator nodes through a large number of paths may also end up getting higher activation values.

After activation spread processor has generated result node list 107, activation node list 108, and activation scores 109, the information is sent to the result clustering module where the results are clustered and the clusters ranked. But before, discussing the result clustering module, several terms used to describe its functions are defined below. Those terms include "path", "path activation value", "path type", "path set", "path set activation value", "result cluster", "node prestige", "path prestige", and "path set prestige".

Path

In one embodiment, a path is a sequence of nodes and edges in an entity-relationship graph that connect one node to another. For example, in FIG. 2, a path from node 202 to node 262 in graph 200 is as follows: node 202->edge 204->node 222->edge 244->node 252->edge 255->node 262. In one embodiment, graph 200 may include multiple paths between the same nodes.

Path Activation Value

According to one embodiment, a path activation value is simply the activation value contributed by a path to an end node.

According to one embodiment, the path activation value is calculated by multiplying a start node's activation value by the product of the length of the path between the start node and end node and a branching value, where the branching value is 1 divided by the product of the degrees of the nodes along the path except the end node This computation is shown below as Equation 2:

Activation(node)*damp(length(path))*branching(path), where branching(path)=1/(degree($n1$) degree($n2$)* ... * degree($n_i$))         Equation 2

In one embodiment, damp is a dampening function like the one described above in connection with the activation spread processor. Length(path) refers to the number of edges in the path.

Path Type

Path type generally refers to the sequence of edge types in a path. For example, in FIG. 2, given the path (node 202->edge 204->node 222->edge 224->node 232->edge 234->node 242), then the path type for this path is (type(edge 104), type(edge 124), type(edge 134)) or ("worksFor", "sender", "recipient").

Path Set

In one embodiment, path set refers to the set of paths in the entity-relationship graph that have the same path type. Thus, every entry in a path set has the same path type label. For example, in FIG. 2, the path (node 202->edge 204->node 222) and the path (node 112->edge 114->node 142) are part of the same path set since both paths have are of the same type: "worksFor".

Path Set Activation Value

Path set activation value generally includes the activation value contributed by a path set. In one embodiment, the path set activation value is calculated by summing the path activation value for each of a path's constituent paths.

Result Cluster

A result cluster refers to the set of result nodes which acquire activation through paths of a certain path type. In one embodiment, the path type is also the label of the result cluster.

Node Prestige

Node prestige refers to a real value which indicates the importance of a node compared to other nodes. In one embodiment, it can be computed by various external means. For example, it may be computed through a page rank algorithm, it may be assigned by people, or it may be computed in some other way.

Path Prestige

The term path prestige refers to the sum of node prestige values of a path's constituent nodes.

Path Set Prestige

Path set prestige generally refers to the average of the path prestige for the constituent paths of a path set.

Result Clustering Module

In one embodiment, a result clustering module is a component of a search engine. Alternatively, it is a software tool separate from a search engine. According to one embodiment, the result clustering module receives as input an entity-relationship graph, a result node list, an activator node list, and activation scores for all the nodes in the entity-relationship graph. It outputs result clusters. Basically, for each result node in the result node list, the result clustering module computes the paths through which the result node acquired "most" of its activation value. In this case, "most" can refer to the path that contributed the highest percentage of activation value, the majority of the activation value, more than a specific threshold value, or in some other way. Note that a result node can acquire activation value through various paths of different path-types. Hence, a result node can lie in more than one result cluster.

For example, in FIG. 1, result clustering module 120 receives as input entity-relationship graph 101, result node list 107, activator node list 108, and activation scores for all the nodes in graph 101. Result clustering module 120 takes the input it receives and computes a set of result clusters that can then be ranked, ordered, and displayed to a user. The result clusters combine related information into groups. In one embodiment, the result clusters can be ranked and shown to the user. The user then can select a result cluster that seems to fit his particular want.

In one embodiment, to calculate the result clusters, result clustering module 120 computes path sets of high path set activation value for each node listed in result node list 107. The high path set activation values are used because they indicate nodes with similar paths types near activator nodes.

To create result clusters, in one embodiment, result clustering module 120 first computes the path sets of high activation value for each result node in result node list 107 and then groups result nodes, with high activation path sets of same type, into result clusters.

Compute the Path Set Activation Value

Result clustering module 120 calculates path sets with high activation value for each result node in result node list 107. According to one embodiment, result clustering module 120 performs an algorithm that is a variant of breadth first search (BFS) algorithm. A BFS algorithm is a search algorithm that begins at a root node and explores all the neighboring nodes. Then for each of those neighboring nodes, the algorithm explores their unexplored neighbor nodes, and so on.

According to one embodiment, result clustering module 120 takes as input a result node (from result node list 107) and activator nodes list 108. Result clustering module then starts a breadth first search from the result node and searches the graph by examining the result node's neighbors and then its neighbors' neighbors, and so forth. For example, once a result node's neighbors have been explored, in one embodiment, result clustering module 120 uses a greedy heuristic to select neighbors for further exploration. In one embodiment, the heuristic the result clustering module 120 uses is one that evaluates which neighbor nodes contribute the most to the result node's activation value. This heuristic is called activation contribution (AC) by a neighbor. In one embodiment the AC can be approximated as:

$$AC(\text{neighbor}) = \text{activation(neighbor)}/\text{degree(neighbor)} \quad \text{Equation 3}$$

Accordingly, result clustering module 120 picks those neighbors which contribute the most to the result node's activation value. In one embodiment, result clustering module can use various thresholds to determine which neighboring nodes contribute the "most". For example, result clustering module may select those the top ten contributing neighbors or pick the neighbors that account for 80% of the node's activation value, those nodes that contribute at least 10% of the activation value, etc.

According to one embodiment, result clustering module 120 keeps traversing a result node's neighboring nodes until it either reaches an activator node or a maximum number of node levels have been explored. In one embodiment, result clustering module 120 may continue until it has found more than one activator node.

Note that, in one embodiment, a number of paths of the same path type may contribute heavily to a result node's activation value in spite of low individual contributions. In such a case, result clustering module 120 may place the neighbor nodes which have the same path type in a bucket. Each such bucket is labeled with the corresponding path type. Once result clustering module 120 has finished exploring a result node's neighbors, the bucket contribution to the result node's activation value calculated by summing the activation contribution of the bucket's constituent nodes.

In one embodiment, result clustering module 120 selects the top contributing buckets to a result node's activation value. For example, the thresholds mentioned above could be used. Once the top buckets have been selected, in one embodiment, within each bucket result clustering module 120 picks the top contributing neighbors using above mentioned thresholds. These neighbors are used for further exploration in the BFS algorithm.

Following is example pseudo code for computing the high activation path sets:

TABLE 1

PseudoCode to Calculate High Activation Path Sets

INPUT:

G: Entity-relationship graph
N: Result node
AN: Activator node list
AV: Activation value
OUTPUT:

List of High Activation Path Sets
1. Create an empty list of paths PathStore
2. Create empty Queue Q.
3. Set N.path = NULL
4. Set N.level = 0
5. Insert N into Queue Q
6. while Queue Q is not empty do
7.    remove a node ND from Q
8.    if ND is one of the nodes in Activator Node List AN then
9.       Compute PathActivation of N.path and add it to pathStore
10.    else if ND.level == maxLevel   /* Do nothing for this node */
11.       continue
12.    else
13.       Get all neighbors of ND from G
14.       for each neighbor nbr of ND do
15.          compute activation contribution using formula
16.          AC(nbr) = activation(nbr)/degree(nbr)
17.       Bucket result nodes based on type of edge that links ND and neighbor.
18.       For each bucket, compute bucket contribution
19.       Pick top buckets
20.       for each top bucket do
21.          pick top contributing nodes in that bucket
22.          for each top node TN do
23.             Set TN.level = ND.level + 1
24.             Set TN.path = (ND.path – TN)
25.             Add TN to Q
26. end /*while loop */
27. Collect paths of same Path Type in pathStore and create pathSets.
28. Find top few (e.g., 3) pathSets with highest path set activation value The example pseudocode, in one embodiment, illustrates the type of computational process result clustering module 120 may perform to create cluster results. Result clustering module 120 receives as input an entity relationship graph, candidate node, activator node list, and activation scores. It outputs a list of high activation path sets. It does so by first creating an empty list of paths and an empty queue to store the result nodes.

Result nodes are initialized and added to the queue and then, once nodes have been placed in the queue, they are popped off and examined. The logic that follows checks to see if a node is part of the activator node list. If the node is an activator node, then, the activation contribution for a path is computed and the top paths are bucketed as described above.

Note that at step 9 in Table 1 result clustering module 120 checks to see if a specified number of levels have been processed. For example, if the user would only like the first three levels of neighbors to be examined, then result clustering module 120 checks to see if it has reached that limit. If not, then result clustering module 120 continues to process the nodes until no more remain the queue.

Also note that in steps 19 and 22 one of the greedy heuristics mentioned earlier (e.g., buckets that contribute 80% or more of the total activation value, etc.) may be used for picking the top bucket contributors.

The path sets (and associated nodes) extracted by result clustering module 120, in one embodiment, are used to create result clusters. According to one embodiment, the path type of a path set defines a result cluster's label.

Generate Result Clusters

Once the high path set activation values have been calculated, result clustering module 120, in one embodiment, generates result clusters list 121 based on the high path set activation values calculated above. According to one embodiment, for each path set generated above, result clustering module 120 defines a cluster with the path type of the path set. Result clustering module 120 then adds the nodes from result node list 107 having a high activation path set of type (say) T to the result cluster that has a corresponding path type T. In this way, result nodes which acquire most of activation through paths with similar path types are clustered together.

Table 2 below illustrates example pseudocode that performs the computations to create result clusters.

TABLE 2

PseudoCode to Generate Result Clusters

INPUT:

G: Entity-relationship graph
RL: Result node list
AN: Activator node list
AV: Activation value scores for nodes in G
OUTPUT:

CL: List of result clusters
1. For each result node N in RL do
2.    X = computeHighActivationPathSets(G, N, AN, AS) [see section 3.3]
3.    For each high activation PathSet PS in X do
4.       In CL, find cluster C with label = label of PathSet PS
5.       If C is not present in CL create new cluster C with label of PS and insert in CL.
6.       Insert result node N in cluster C
7. Return list of result clusters CL.

The list of result clusters 121 is then sent to cluster result ranker 130.

Cluster Result Ranker

In one embodiment, cluster result ranker 130 is a component of a search engine. Alternatively, it is a software tool separate from the search engine. The cluster result ranker 130 receives as input the result cluster generated by result clustering module 120 and ranks them. By doing so, cluster result ranker 130 can provide a user with the option to view a set of search results that are clustered by similar path type. The user can then select the path type that better corresponds to their search query. In this way, the user is provided with more pointed and relevant search results.

In one embodiment, when cluster result ranker 130 receives the result clusters from result clustering module 120, it ranks the result clusters. According to one embodiment, cluster result ranker 130 evaluates each of the result clusters and ranks the result nodes in the cluster according to the activation value contributed by the path set of the result cluster's path type. In this way, cluster result ranker 130 ranks result nodes which have acquired more activation through paths of the result cluster's specified path type higher within the result cluster.

In one embodiment, additional external measures of node prestige or importance for ranking results within a cluster may also be used to adjust and rank the result clusters. For example, node prestige database 140 may include additional data that causes a particular node to be ranked higher than other nodes. For example, if a node is popular among other search queries it may have a higher node prestige and be ranked higher, or a node may be rated by users as a useful website, or the node may be an advertiser that pays to be ranked higher, etc. Similarly path prestige measures may also be included to adjust the cluster rankings.

Within each result cluster, result nodes are scored and ranked. Table 3 illustrates example pseudocode that performs the computations to score and rank result nodes within a result cluster:

TABLE 3

PseudoCode to Rank the Cluster Results

INPUT:

CL: list of result clusters
OUTPUT:

CL: list of ranked result clusters
1. For each result cluster C in CL do
2.    For each result node N in C do
3.       For node N, get its high activation PathSet PS of type = label of cluster C
4.       score(N) = alpha * (PathSetActivation of PS) +
(1 – alpha)*(PathSetPrestige of PS)
5.    sort result nodes in decreasing order of their scores.
Where alpha may be a parameter in the range [0,1] to decide how much importance to give to each factor.

Clustering the Proximity Query Results

Figure 3:
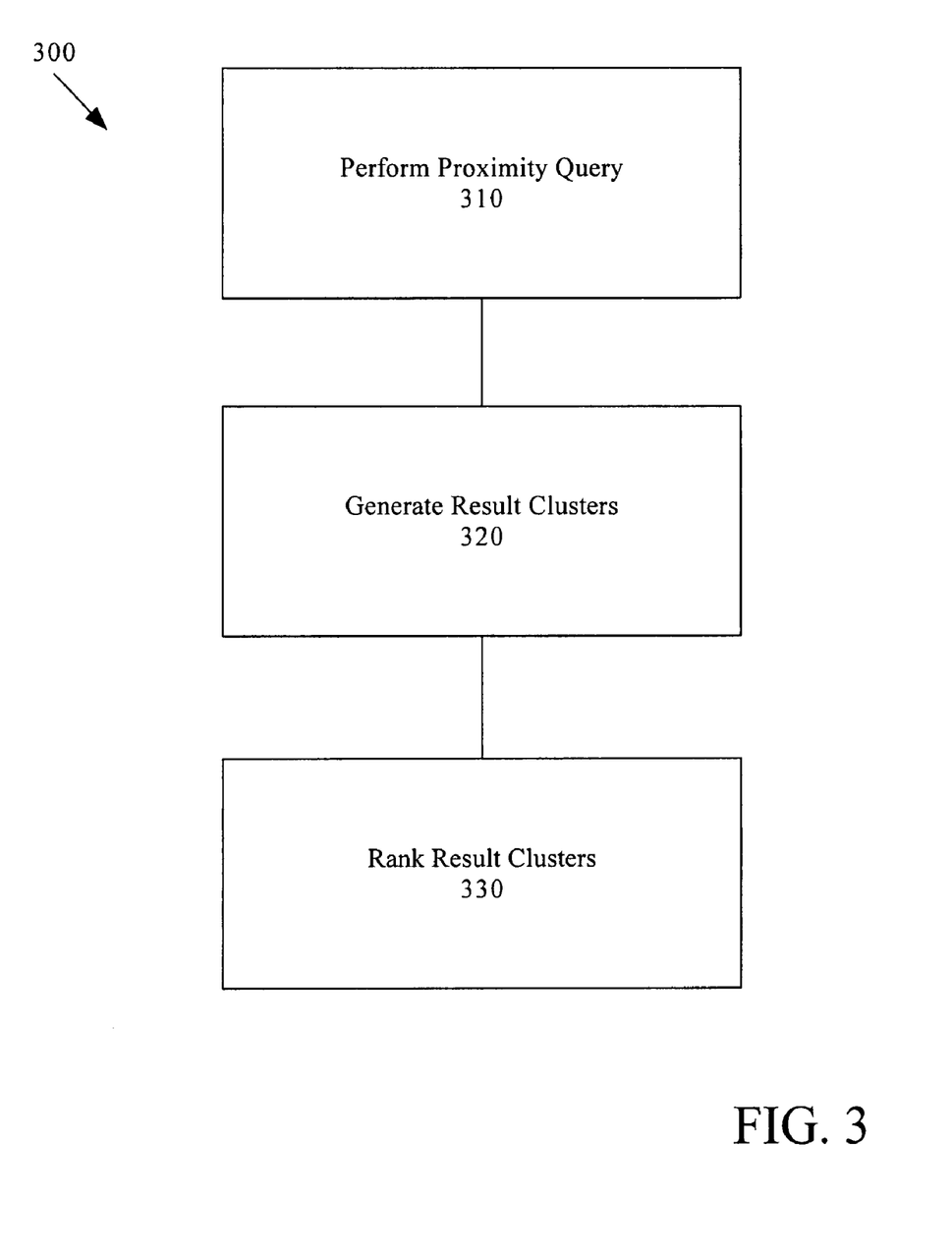
FIG. 3 is a flowchart illustrating a procedure for finding result clusters and ranking the result clusters, according to an embodiment of the invention.

Turning to FIG. 3, it is a flowchart illustrating procedure 400 for finding and displaying result clusters to a user interface. For example, in one embodiment, procedure 300 allows a user to select information that better meets his needs. The user can then browse results within a cluster.

It should be noted that although, procedure 300 is discussed below in terms of a web search engine and a web browser, the principles described in connection with procedure 300 can be applied to a wide variety of other scenarios.

Assume for this example that a computer user named Larry would like to find more information about a document he recently read. The document discussed a possible new standard for securing file transfers over wireless networks. More specifically, Larry remembers another article that discussed a similar topic and he would like to find out what organization/author drafted the other document, so he knows what groups are involved in developing the proposed standard. Unfortunately, Larry cannot remember the name of the other document. Larry only remembers the name of the author of the first document (e.g., "Jack"). Accordingly, Larry opens a web browser and accesses a web search engine. In the web search engine's user interface, Larry enters the search terms "organization" and "Jack". In one embodiment, the search terms Larry provided in search field are converted into a proximity query that is submitted to the search engine. Alternatively, Larry submits a search query that is in the proximity query format discussed above. In one embodiment, the proximity query is "FIND 'organization' NEAR 'person=Jack'".

Note that individually the words in the proximity query do not capture what type of information Larry would like to retrieve. For example, based on the search terms, the search engine may assume Larry is looking for the organization Jack works for and nothing else. In reality, this is not the case, he wants to know the name of an organization that may be completely unaffiliated with Jack or his paper.

Accordingly, at step 310 of procedure 300, the proximity query is received by the search engine, and the search engine executes it. In one embodiment, the search engine includes tools like those described in connection with FIG. 1 to find organizations that are near Jack.

When the proximity query is received by the search engine, the proximity query is executed against the search engine's data repositories to find organizations that are near Jack. In one embodiment, the search engine data repositories include entity-relationship graphs, such as graph 200 shown in FIG. 2. As the search engine executes the proximity query, it generates a result node list, activator node list, and activation value scores using the algorithms described above. According to one embodiment, the step of executing the proximity query against the search engine's data repositories is performed by a search engine's activation spread processor as discussed above in connection with FIG. 1.

For example, suppose the search engine executes the proximity query against graph 100. The search engine first finds activator nodes that satisfy the predicate clause in the proximity query and candidate nodes that are of the type being requested in the proximity query. Accordingly, the search engine begins its search at a root node (e.g., node 202) and traverses the tree until it finds nodes that match the predicate clause and nodes that or of type organization. The nodes that are of type organization are labeled candidate nodes. In graph 200, node 222 satisfies the predicate clause (e.g., it is an activator node) and nodes 202 and 212 are of type organization (e.g., they are candidate nodes).

The search engine then creates the result node list and the activation scores for each node in the graph. To do so, the search engine begins at an activator node, such as node 222, and begins computing activation values for the nodes in the graph.

If node 222 does not have an initial activation value, the search engine assigns it one. In one embodiment, this can be done manually or by some external means (e.g., page rank algorithm).

Once node 222 has been assigned an activation value, the search engine finds node 222's neighbors and calculates the activation value for each of the neighbor nodes. In one embodiment, the activation value for the neighbor nodes is computed using the activation algorithm shown in Equation 1. Once a score for a node has been computed it is stored in connection with the node.

Assume that the initial activation value for all the nodes in graph 200 (including node 222) is one and all the edges are weighted as one. Also assume that there are no dampening effects. Accordingly, the search engine traverses graph 200 to find node 222's neighbors. In this case, it finds nodes 202, 232, and 252. The search engine then computes the activation value for each of those nodes. In one embodiment, the search engine applying Equation 1 to the activation value for node 222 derives the following activation values for the nodes: node 202=1, node 232=⅓, and node 252=⅓.

The search engine then looks to see if it can calculate the activation values for node 202's neighbors. Node 202 does not have any neighbors (besides the activator node), so the next node the search engine evaluates is node 232. Node 232 has neighbor nodes 252 and 242. The search engine proceeds to determine the activation values for those nodes: node 252=⅑ and node 242=⅑. The search engine then processes node 252's neighbors and so forth until each node in graph 200 has been evaluated.

Note that a node, such as node 252, can have activation values associated with different neighbor nodes. In one embodiment, the total activation value of node 252 is the sum of all the path activation values.

In one embodiment, node 212 has an activation value based on the sum of the activation values calculated along the following paths: (node 222->edge 224->node 232->edge 234->node 242->edge 214->node 212)+(node 222->edge 224->node 232->edge 254->node 252->edge 255->node 262->edge 264->node 242->edge 214->node 212)+(node 222->edge 244->node 252->edge 255->node 262->edge 264->node 242->edge 214->node 212).

Once the activation values for each candidate node has been calculated, the search engine then ranks the candidate nodes based on the total accrued activation value. Accordingly, candidate node 202 has a value of 1 and candidate 212 has an activation value based on the accrued activation values of its neighboring nodes. In this example, node 212's activation value is less than one. Accordingly, node 202 is ranked as the first candidate node and node 212 is ranked as a second candidate node. The heuristics for the search engine specify that the top 10 candidate nodes are added to the result nodes list. Since there are only two nodes of type "organization", both nodes 202 and 212 are added to the result node list.

At step 320, the search engine generates result clusters using the result node list, activator node list, and activation scores computed for nodes in graph 200. Generating result clusters involves computing path set activation values and then grouping nodes based on the computed path set activation values. In one embodiment, a result clustering module generates the result clusters as described above in connection with FIG. 1.

To create the result clusters, the search engine removes one of the result nodes from the result nodes list, finds paths to an activator node from the result node, and then computes a path set activation value for the path from the result node to the activator node. For example, suppose the search engine removes node 202 from the result nodes list in order to determine node's path set activation value. The search engine gets all of node 202's neighbor nodes, computes the activation contribution of each neighbor node along the path to an activator node, and buckets the neighbor node based on the type of edge that links the node to its neighbor. Here, node 202 only has one neighbor node and one path leaving the node. In other words, node 212 is the only node that contributes to node 202's activation value in this example. The activation contribution of node 222 to 202 is 1. Once the activation value has been determined, in one embodiment, the search engine creates a bucket based on the path type (e.g., node 222->edge 204->node 202 or Jack->"worksFor"->Yahoo) and places node 202 in the bucket.

The search engine then performs the same process for result node 212. The search engine processes node 212's neighbors, calculates the activation contribution of each neighbor node to node 212's total activation value according to Equation 3. Once the activation contribution for the neighbor nodes has been computed, the search engine finds the neighbor nodes' neighbors and computes the activation contribution of those nodes to the neighbor nodes. This process continues until an activator node is identified. Then, the path set activation for the path from the result node to the activator node is computed by summing the path activation value of intervening paths. Accordingly, a path set activation value for the following paths are computed by summing path activation values: (node 222->edge 224->node 232->edge 234->node 242->edge 214->node 212), (node 222->edge 224->node 232->edge 254->node 252->edge 255->node 262->edge 264->node 242->edge 214->node 212), and (node 222->edge 244->node 252->edge 255->node 262->edge 264->node 242->edge 214->node 212).

A cluster is created for each of these paths and a copy of node 212 is placed in each of the clusters. The name of the cluster, in one embodiment, is the path name. In this way, the result nodes are clustered based on their relationship with the activator node. In one embodiment, if there are a lot of buckets or a lot of nodes in a bucket, then the search engine may narrow the number of nodes or buckets by selecting those nodes and/or buckets that are the largest contributors to the path set activation vale.

Finally, in step 330, the search engine ranks the result clusters. To do so, the search engine evaluates each result cluster. The evaluation of a result cluster involves assigning a score to each result node in a cluster. Table 3 above includes an example formula for computing a score for a result node in a cluster. For example, in graph 200, the cluster containing sorts result node 202. Similarly, the clusters including node 212 are also sorted. In one embodiment, the activation value of a node in a cluster may be increased by multiplying the nodes path set activation value by an importance parameter or a node prestige/path prestige factor.

In addition, the clusters themselves may be ranked and sorted based on an overall activation value, based on path length, or other such factors.

Once the result nodes in a cluster have been sorted, the cluster labels are displayed to the user. For example, in Larry's case, after the search engine has generated the result clusters, sorted the result nodes in the clusters, and ranked the result clusters, the paths are converted into links and displayed to him. For example, one link displayed to Larry may list "Jack->"worksFor"->Yahoo" as a path containing results related to his search query. Similarly, another link may list "Jack->authoredBy->document->citedBy->document->authoredBy->John->Alpha".

Larry sees the second path and notices that it includes a document cited by the original document he read. He selects that link and is directed to information related to the Alpha organization. In one embodiment, information and terms identified in a result node may be resubmitted to the search engine in order to generate additional search results.

Hardware Overview

Figure 4:
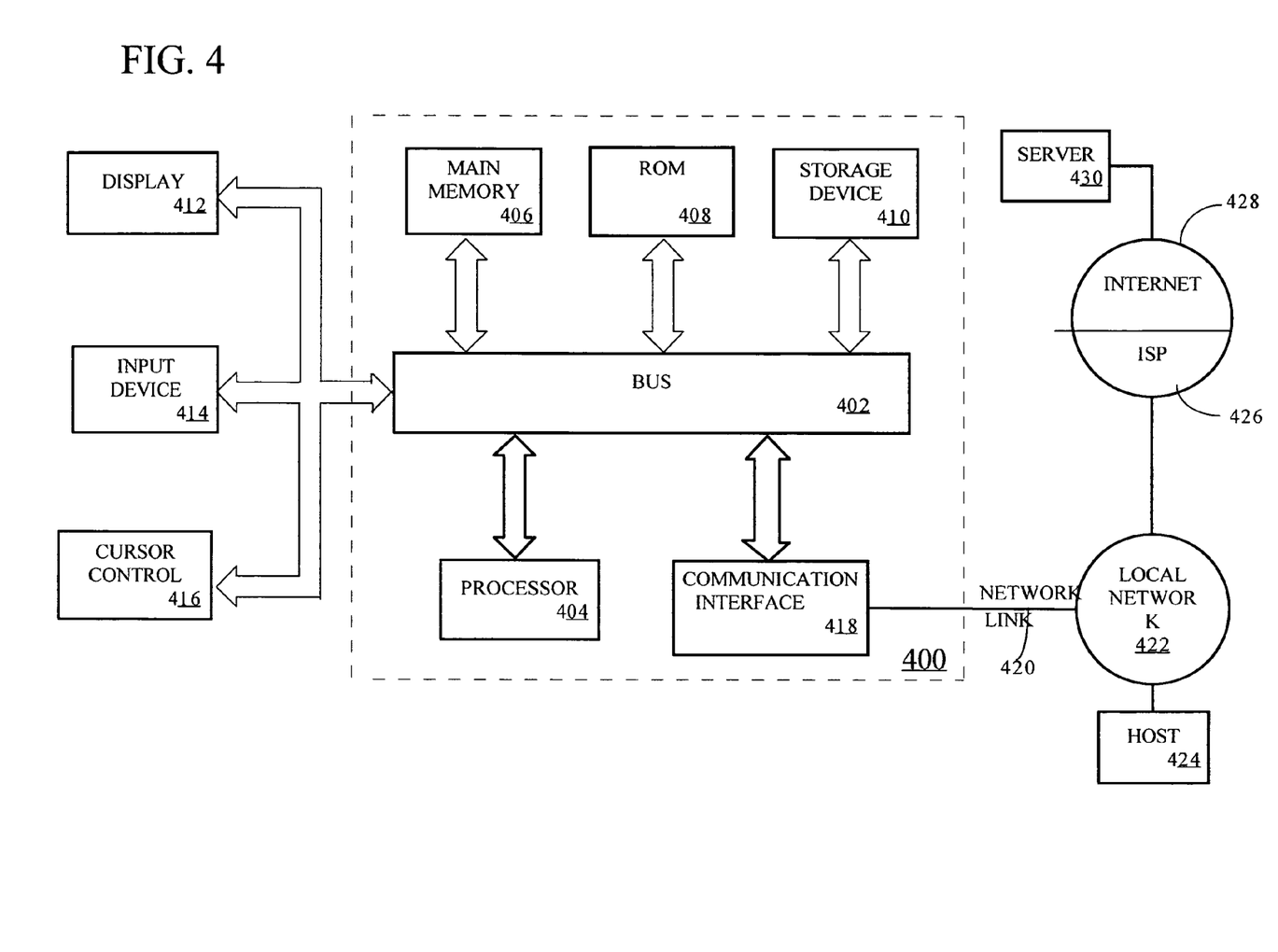
FIG. 4 is a block diagram of a computer system on which implementations of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one implementation of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for displaying search results to a user comprising:
  receiving, by a search engine, user input to perform a proximity query on a graph, wherein said graph includes one or more nodes and one or more edges;
  wherein said proximity query specifies (a) a particular node type, and (b) a predicate clause;
  executing, by the search engine, the proximity query, by:
    generating a set of candidate result nodes that match said particular node type,
    generating a set of activator nodes that satisfy said predicate clause, and
    computing an activation value for each candidate result node, wherein said activation value reflects a relative importance of the candidate result node with respect to a particular activator node from said set of activator nodes;
  generating, by the search engine, a set of result clusters that include one or more result nodes from said set of candidate result nodes, wherein a result cluster is identified by a path to at least one activator node in said set of activator nodes;
  ranking, by the search engine, said one or more result nodes in said result clusters based on the activation value of each of the one or more result nodes in said result clusters; and
  based on the ranking, displaying to a user a representation of said result clusters;
  wherein the step of executing the proximity query is performed by one or more computing devices.

2. The method of claim 1, wherein executing the proximity query comprises:
  assigning an initial activation value to each of the activator nodes in said set of activator nodes;
  iterating over each of the activator nodes, calculating a neighbor activation value for a set of neighbor nodes of said activator node, wherein said neighbor activation value is based at least in part on the initial activation value of the activator node;
  computing a total accrued activation value for each of said result nodes in the set of candidate result nodes;
  wherein the total accrued activation value for each of said result nodes in the set of candidate result nodes is computed by iteratively adding the neighbor activation values for each of said neighbor nodes; and
  ranking the set of result nodes based on the total accrued activation value.

3. The method of claim 1, wherein generating the result clusters includes:
  computing a path set activation value between at least one activator node and at least one result node in said set of candidate result nodes; and
  for each path set activation value above a certain threshold:
    determining at least one result cluster for the at least one result node; and
    inserting the at least one result node in said at least one result cluster.

4. The method of claim 3, further comprising labeling the result cluster by the common path type.

5. The method of claim 3, wherein computing the activation path sets includes performing a breadth first algorithm.

6. The method of claim 5, wherein the breadth first algorithm is limited to a fixed number of levels of exploration.

7. The method of claim 1, wherein ranking, by the search engine, said one or more result nodes in said result clusters includes:
  determining a score for each result node in said result cluster, wherein said score based on said path set activation value; and
  sorting the result nodes based on said scores.

8. The method of claim 1, wherein said result clusters are adjusted based on node prestige.

9. The method of claim 1 wherein:
  the predicate clause comprises a particular keyword; and
  the set of activator nodes satisfy the predicate clause by matching the particular keyword.

10. A machine-readable volatile or non-volatile storage medium for displaying search results to a user, the machine-readable storage medium storing instructions which, when processed by one or more processors, causes the one or more processors to perform:

receiving, by a search engine, user input to perform a proximity query on a graph, wherein said graph includes one or more nodes and one or more edges;

wherein said proximity query specifies (a) a particular node type, and (b) a predicate clause;

executing, by the search engine, the proximity query, by:
        generating a set of candidate result nodes that match said particular node type,
        generating a set of activator nodes that satisfy said predicate clause, and
        computing an activation value for each candidate result node, wherein said activation value reflects a relative importance of the candidate result node with respect to a particular activator node from said set of activator nodes;

generating, by the search engine, a set of result clusters that include one or more result nodes from said set of candidate result nodes, wherein a result cluster is identified by a path to at least one activator node in said set of activator nodes;

ranking, by the search engine, said one or more result nodes in said result clusters based on the activation value of each of the one or more result nodes in said result clusters; and     based on the ranking, displaying to a user a representation of said result clusters.

11. The machine-readable storage medium of claim 10, wherein executing the proximity query comprises:

assigning an initial activation value to each of the activator nodes in said set of activator nodes;

iterating over each of the activator nodes, calculating a neighbor activation value for a set of neighbor nodes of said activator node, wherein said neighbor activation value is based at least in part on the initial activation value of the activator node;

computing a total accrued activation value for each of said result nodes in the set of candidate result nodes;

wherein the total accrued activation value for each of said result nodes in the set of candidate result nodes is computed by iteratively adding the neighbor activation values for each of said neighbor nodes; and     ranking the set of result nodes based on the total accrued activation value.

12. The machine-readable storage medium of claim 10, wherein generating the result clusters includes:

computing a path set activation value between at least one activator node and at least one result node in said set of candidate result nodes; and     for each path set activation value above a certain threshold:
        determining at least one result cluster for the at least one result node; and
        inserting the at least one result node in said at least one result cluster.

13. The machine-readable storage medium of claim 12, further comprising labeling the result cluster by the common path type.

14. The machine-readable storage medium of claim 12, wherein computing the activation path sets includes performing a breadth first algorithm.

15. The machine-readable storage medium of claim 14, wherein the breadth first algorithm is limited to a fixed number of levels of exploration.

16. The machine-readable storage medium of claim 10, wherein ranking, by the search engine, said one or more result nodes in said result clusters includes:

determining a score for each result node in said result cluster, wherein said score based on said path set activation value; and     sorting the result nodes based on said scores.

17. The machine-readable storage medium of claim 10, wherein said result clusters are adjusted based on node prestige.

18. The machine-readable medium of claim 10 wherein:

the predicate clause comprises a particular keyword; and the set of activator nodes satisfy the predicate clause by matching the particular keyword.

\* \* \* \* \*